United States Patent [19]
Mueggenburg et al.

[11] Patent Number: 5,614,093
[45] Date of Patent: Mar. 25, 1997

[54] DISCRETE PORE PLATELET FILTER MANUFACTURED BY ELECTROPOLISHING

[75] Inventors: H. Harry Mueggenburg, Carmichael; Leland L. Lang, Lodi; Donald C. Rousar, Fair Oaks; Marvin F. Young, El Dorado Hills, all of Calif.

[73] Assignee: Aerojet-General Corporation, Sacramento, Calif.

[21] Appl. No.: 518,378

[22] Filed: Aug. 23, 1995

[51] Int. Cl.⁶ .............................. B01D 29/44; B01D 29/64
[52] U.S. Cl. .................. 210/355; 210/415; 210/488; 210/492; 210/496; 210/510.1; 55/522
[58] Field of Search ..................................... 210/355, 413, 210/415, 510.1, 488, 489, 496, 492; 55/522

[56] References Cited

U.S. PATENT DOCUMENTS

| | | |
|---|---|---|
| 664,833 | 1/1901 | Collins . |
| 683,386 | 9/1901 | Corlett . |
| 1,741,444 | 12/1929 | Slider . |
| 2,776,055 | 1/1957 | Adler . |
| 3,702,659 | 11/1972 | Clark . |
| 4,721,567 | 1/1988 | Uram . |
| 4,740,312 | 4/1988 | Dahlquist . |
| 4,932,112 | 6/1990 | Tikkanen . |
| 5,023,054 | 6/1991 | Sato et al. . |
| 5,089,128 | 2/1992 | Garaschenko et al. . |
| 5,141,641 | 8/1992 | Burgess . |
| 5,415,781 | 5/1995 | Randhahn . |

FOREIGN PATENT DOCUMENTS

| | | |
|---|---|---|
| 3833807 | 4/1990 | Germany . |
| 57-113815 | 7/1982 | Japan . |
| 5-84428 | 4/1993 | Japan . |

OTHER PUBLICATIONS

*Electroplating Engineering Handbook* (1978) Edited by A. Kenneth Graham.

Primary Examiner—Thomas M. Lithgow
Attorney, Agent, or Firm—Townsend and Townsend and Crew LLP

[57] ABSTRACT

A micropore filter of discrete flow-through pores of highly controlled pore configuration and dimensions is formed by bonding platelets into a laminate, each platelet having been etched, preferably by a combination of electropolishing and photoetching techniques, to form depth-etched passages and through-etched passages, respectively. The filter is housed in a module which contains wiper blades for periodically removing deposited debris from the filter surface.

14 Claims, 5 Drawing Sheets

DISCRETE PORE PLATELET FILTER MANUFACTURED BY ELECTROPOLISHING

BACKGROUND OF THE INVENTION

Liquid or gas filtration in the 1 to 20 micron range is currently performed primarily by using disposable filter media. While filter media of this type provides acceptable filtration performance, it does so at high cost. The filter media itself is costly, due in part to the need for frequent replacement of the media. Disposal of spent media also presents a problem, since federal authorities consider most of the spent media to be hazardous waste and therefore subject to regulations for hazardous waste disposal.

Regenerable filter media in the form of metallic wire filters and sintered powder filters are also used. These are random pore filters, however, and regeneration is never complete since backflushing invariably leaves a certain amount of trapped contaminant within the media.

SUMMARY OF THE INVENTION

The present invention resides in a filter formed of a laminate of etched platelets. The etched regions of the platelets form discrete, ordered pores, microscopic in size, forming filter passages of highly controlled dimensions, orientations and arrays. In preferred embodiments, the filter contains both filtration passages where the filtration occurs and manifold passages that provide access between the exterior of the filter and the filtration passages to achieve maximum and substantially independent usage of all filtration passages in the filter. The filtration passages are smaller than the manifold passages and control the particle size effectively filtered by the filter. The filter passages are preferably depth-etched rather than through-etched, and the etching of the filter passages is performed by electropolishing, which permits the formation of extremely small and precisely formed filter passages. The etching of the manifold passages can be performed by electropolishing or by other, more conventional techniques, such as photochemical etching.

The ordered array of filter passages and manifold passages allows the laminate to be backflushed with a full reopening of all passages. This eliminates the need for disposal or for compliance with hazardous waste regulations. The highly controlled pore sizes also permit close control over the filtration range and maximum usage of the full surface area of the filter. A further advantage is that the laminate can be formed with a flat and smooth exterior surface, permitting the use of a wiper blade or similar means for easily removing particulate matter deposited on the laminate surface.

These and other features and advantages of the invention will be more readily apparent from the description which follows.

DETAILED DESCRIPTION OF THE INVENTION AND PREFERRED EMBODIMENTS

Figure 1:
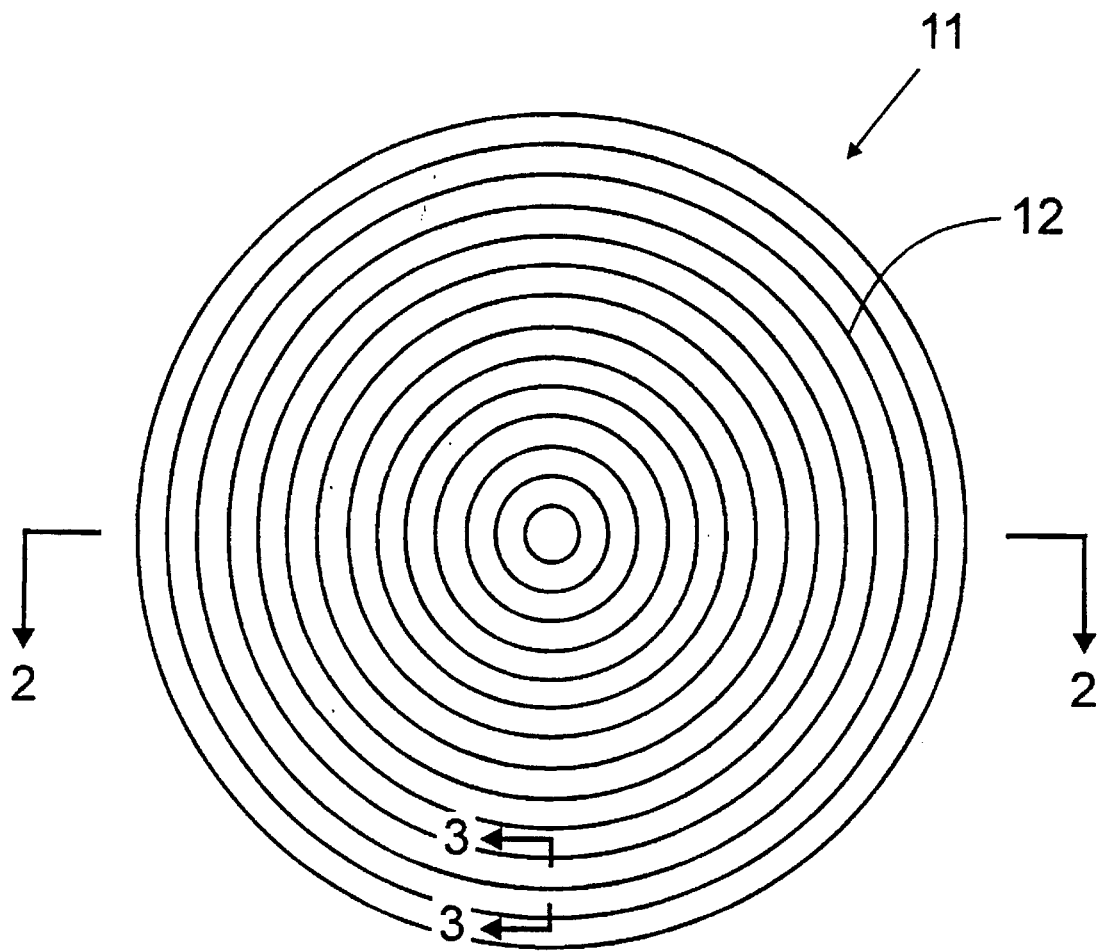
FIG. 1 is a plan view of a laminated platelet filter disk for use in accordance with the present invention.

The platelet laminate consists of multiple layers of thin metal foils with extremely small filter passages formed by etching, preferably some of the passages having been depth-etched by electropolishing to form closely spaced filtration passages and other passages having been through-etched by photoetching to form inlet and outlet manifolds communicating with the filtration passages. The thin metal foils can be formed from a wide variety of bondable metals and metal alloys. Examples of these metals and alloys are:

copper alloys: OFHC, ZrCu, NARLOY Z®, GLID COP®

Inconel (nickel-chromium alloys): 600, 718 nickel alloys: 200 series alloys nolybdenum aluminum alloys: 1100, 3000, 5000, 6061 titanium and titanium alloys: CP (chemically pure), 6A14V, 15-3.3.3, Beta 21-S stainless steels: 347, 304L, 316 platinum-iridium alloys and platinum-rhodium alloys

The choice of foil material will depend on the needs of the filter, including such factors as the corrosiveness and other chemical properties of the fluid being filtered, the type of contaminant expected to be present in the fluid, the level of contaminant, and the expected throughput rate.

The platelets may vary in thickness, and the thicknesses of individual platelets are not critical to the invention. In most cases, however, it is contemplated that platelets having thicknesses less than about 0.025 inch (0.064 cm) per platelet will be used. Preferably, the platelet thicknesses will fall within the range of about 0.001 inch (0.00254 cm) to about 0.025 inch (0.064 cm), more preferably about 0.001 inch to about 0.010 inch (0.0254 cm), and most preferably about 0.001 inch to about 0.005 inch (0.0127 cm). The number of platelets in the laminate will vary, depending on any perceived limitations in the pressure drop imposed by the flow system in which the filter is used, and on the filtration capacity needed. In most applications, the laminate will consist of at least four platelets, preferably ten or more. In one presently contemplated embodiment of the invention, the platelets are 0.002 inch (0.0051 cm) in thickness, and the laminate consists of twelve platelets. In some applications, thicker laminates containing more platelets, such as 50 to 100, will be preferred.

Platelets can be etched by any of various known methods. In the present invention, the preferred method for depth-etching of the filter passages is electropolishing, which is generally accomplished by masking areas of the platelet in a negative of the etching pattern, then immersing the platelet in an ionic solution and connecting the platelet to an electrical circuit passing through the solution with the platelet connected as the anode. The platelet is then removed from the bath, washed, and the mask removed. The preferred method for creating the through-etched passages is photoetching.

Electropolishing methods and solutions are commercially available in forms specifically designed for a wide variety of metals. In general, however, the solutions are aqueous solutions of salts or acids, and examples of metals and solutes which can be used in the electropolishing bath are as follows:

aluminum: sodium phosphate-carbonate, fluoboric acid, phosphoric-sulfuric-chromic acid brass: phosphoric-chromic acid copper: phosphoric-chromic acid, phosphoric acid Monel: phosphoric-sulfuric-hydrochloric acid nickel: sulfuric acid, phosphoric-sulfuric acid, phosphoric-sulfuric-chromic acid, phosphoric-sulfuric-hydrochloric acid, nickel-silver: phosphoric-chromic acid silver: potassium cyanide stainless steel: phosphoric acid, phosphoric-sulfuric acid, phosphoric-sulfuric-chromic acid, sulfuric-citric acid, phosphoric-chromic acid, phosphoric acid-butanol, sulfuric-glycolic acid, sulfuric-phosphoric acid plus aniline, sulfuric-phosphoric acid plus morpholine Electropolishing is generally conducted at temperatures within the range of 110°–250° F. (43°–121° C.), preferably 130°–220° F. (55°–105° C.) at current densities in the range of about 50 to 3000 amp/ft$^2$ (0.05–3.23 amp/cm$^2$), preferably 500 to 3000 amp/ft$^2$ (0.54–3.23 amp/cm$^2$), for 1 to 10 minutes.

Photoetching (or photochemical) etching is a conventional technique which involves the use of a mask applied by photographic techniques, followed by chemical etching through the mask. Common etchants are nitric acid and ferric chloride, the choice depending on the particular metal being etched. Application of the etchant may be achieved by spraying or other conventional techniques, preferably in a chamber with elevated temperature as the masked platelet passes through the chamber at a controlled rate. One presently contemplated process involves the use of ferric chloride at 110° F. (43° C.). Following etching, the platelet is washed and the mask removed, as in electropolishing.

The etched passages may be either through-etched (i.e., etched through the entire thickness of the platelet) or depth-etched (etched only partially through the thickness of the platelet to achieve a depression or indentation in the platelet surface). The cross sections of the passages formed by the etched regions when the platelets are laminated define the effective pore size of the filter. This will vary in accordance with the option of the manufacturer. In most cases, the cross section will be less than about 1×10$^{-5}$ square inch (6.45× 10$^{-5}$ cm$^2$), preferably from about 1×10$^{-7}$ to about 1×10$^{-5}$ square inch (6.45×10$^{-7}$ to 6.45×10$^{-5}$ cm$^2$). Considering the cross section as rectangular in shape, the shortest side of the rectangle is preferably less than about 0.010 inch (0.0254 cm) in length, more preferably less than about 0.005 inch (0.0127 cm) in length, and most preferably less than about 0.003 inch (0.00762 cm) in length. As indicated above, depth-etching is preferably performed by electropolishing and through-etching by photochemical etching.

The methods of bonding the platelets together to form the laminate will vary with the materials, but are known among those skilled in the art. One method is diffusion bonding, which is the metallurgical joining of two platelets at their surfaces by applying heat and pressure for a sufficient time to cause atoms from one platelet at locations near its surface to migrate into the other platelet. With the temperature held below the melting points of the platelets, the platelets remain in the solid state during the procedure.

Another bonding method is brazing, which is the welding of two platelets together through a non-ferrous brazing metal or alloy which has a melting point lower than that of the platelet material. Examples of brazing metals and alloys are copper, copper-zinc, copper-phosphorus, silver-copper, gold, nickel, cobalt, aluminum-silicon, and magnesium-aluminum. The temperature and pressure at which brazing is performed, and the selection of optimal brazing metals and alloys for particular platelet materials are known to those skilled in the art.

A third bonding method is the use of adhesives. Any of the wide variety of adhesives for metals can be used. Examples are epoxy resins, phenolic resins, acrylics, polyimides, polyphenylquinoxalines, and polyurethanes. Again, the methods of applying the adhesives to the platelet surfaces, the temperatures and pressure at which the adhesives are cured once the platelets are stacked, and the optimal choice of adhesive for particular platelet materials are known to those skilled in the art.

While the optimal pressures for bonding of the platelets will vary depending on the type of bonding, the bonding pressure for best results in most applications will usually be about 200 psi (1.4 MPa), preferably about 500 psi (3.4 MPa) or above, and most preferably from about 1000 psi to about 3000 psi (7 to 21 MPa). Optimal temperatures will vary similarly, although best results in most applications will generally be about 400° C. or above, and preferably about 400° C. to about 1200° C.

The laminate may assume any physical configuration, although it will generally be in the form of a flat plate with relatively smooth sides. A preferred shape is that of a circular disk 11, as shown in FIG. 1. FIG. 1 is a simplified representation of the disk, showing one side of the disk with inflow channels 12 arranged as concentric circles. Although not visible in this view, the disk also contains outflow channels open to the opposite face of the disk. The outflow channels are also arranged as concentric circles, coaxial with those of the inflow channels but with radii approximately midway between the radii of successive inflow channels; the two types of channels thus alternate through the body of the disk.

Figure 2:
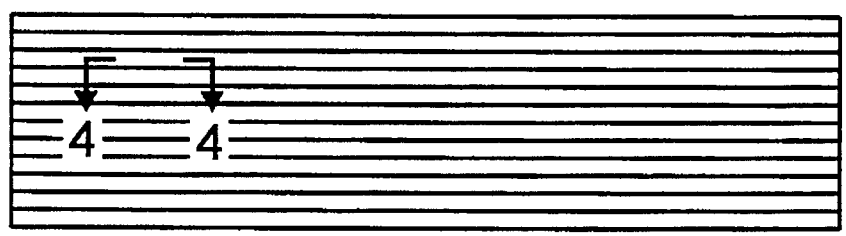
FIG. 2 is a cross section of the disk of FIG. 1, taken along the line 2—2 of FIG. 1.
Figure 3:
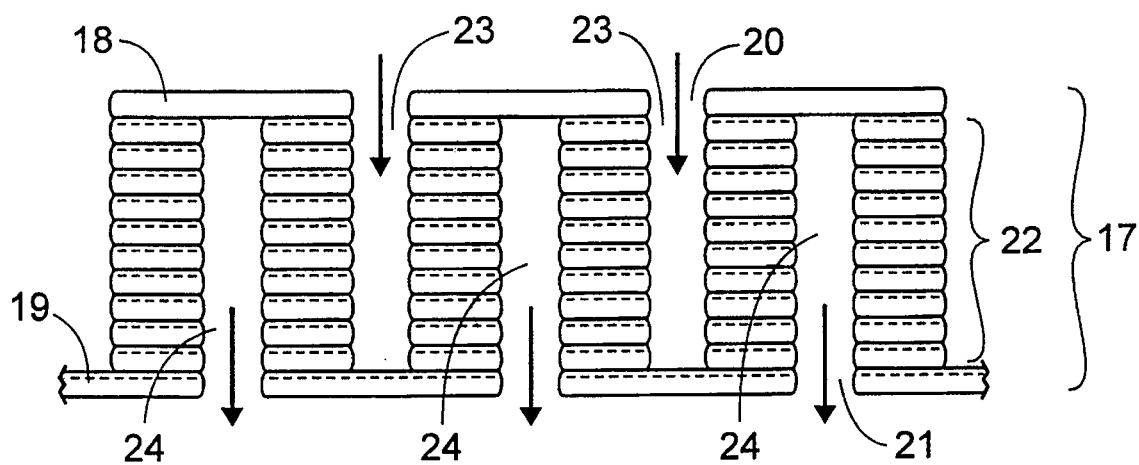
FIG. 3 is an enlarged cross section of a portion of the disk of FIG. 1, taken along the line 3—3 of FIG. 1.
Figure 4:
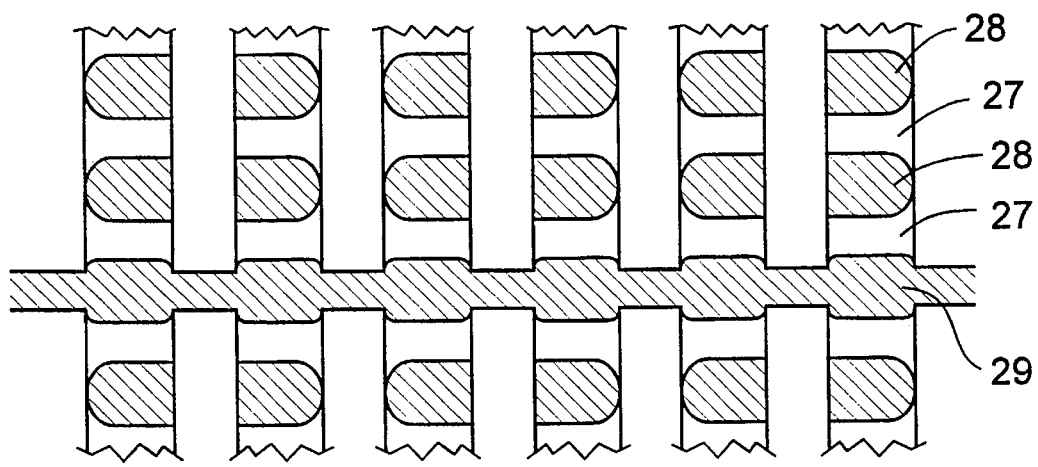
FIG. 4 is an enlarged cross section of one of the platelets of the filter disk of FIG. 1, taken along the line 4—4 of FIG. 2.

FIG. 2 is a cross section of the disk 12, taken along the line 2—2 of FIG. 1, showing the various platelets 13. FIG. 3 is an enlarged cross section taken along 3—3 of FIG. 1, showing the platelet stack, the etched regions and the passages formed by the etched regions. FIG. 4 is another enlarged cross section, taken along 4—4 of FIG. 2, showing a portion of one platelet in the stack.

The platelet stack 17 shown in FIG. 3 contains twelve platelets. The platelet shown as the uppermost platelet 18 forms the surface of the laminate at the inlet side and is the only platelet not to contain any filter passages, while the platelet shown as the lowermost platelet 19 forms the surface at the outlet side. These two platelets contain wide openings 20, 21 which are aligned with identical openings in the internal platelets 22. One set of these openings forms the inflow channels (also termed "inlet manifolds") 23 which permit access of the incoming fluid to each of the internal platelets and the filter pores in each of the internal platelets. The other set forms the outflow channels (or "outlet manifolds") 24 communicating with the outlets of the filter pores in each platelet. The inflow channels are open only to the inlet side of the platelet stack, and the outflow channels are open only to the outlet side.

Each platelet is thus through-etched in the regions of the inflow and outflow channels, and depth-etched in regions connecting the inflow and outflow channels. The depth-etched regions are the filter passages or pores, and are represented by the dashed lines in FIG. 3. FIG. 4 shows the filter passages 27 in detail, as depressed areas on the platelet surface. The non-etched areas 28 are the regions at which adjacent platelets are bonded together. The depressed areas forming the filter passages are shallow flat-bottomed recesses whose depths are less than their widths. The effective pore size is therefore determined by the depth. In one presently contemplated embodiment of the invention, the filter passages are depth-etched by electropolishing to a depth of 0.0002 inch ($5.1\times10^{-4}$ cm), 0.002 inch ($5.1\times10^{-3}$ cm) in width, 0.004 inch (0.0102 cm) in length, and are separated by nonetched regions 0.004 inch (0.0102 cm) in width. This of course represents but one example.

Also shown in FIG. 4 is an elongated strip 29 of platelet which has not been etched, either by depth-etching or through-etching, and which extends across the inflow and outflow passages, oriented radially relative to the filter disk. This is a stabilizing strip which maintains the spacing of the strips between the inflow and outflow passages, and helps maintain the integrity of the stack during the platelet bonding process. Several of these stabilizing strips are arranged radially at intervals around the disk.

Staged filtration laminates can be formed by combining platelets of differently sized filter passages in a single laminate. For example, the degree of depth-etching can be varied between adjacent disks to vary the effective pore size. The platelet closest to the inlet side of the disk may for example have depth-etched filter passages 0.001 inch (25 microns) in depth to serve as a coarse filter; the adjacent (second) platelet may have depth-etched filter passages 0.0006 inch (15 microns) in depth to serve as a medium filter; and the third platelet may serve as a fine filter by having depth-etched filter passages 0.0002 inch (5 microns) in depth. The flow rate through the filter passages can be maintained constant among the staged platelets by increasing the number of such passages as the passage depth decreases. This can be achieved by shortening the spacing between the inflow and outflow channels to provide more channels per unit area of disk, and accordingly shortening the length of the filter passages. Staging in the radial direction of the disk can also be achieved in like manner.

Many further variations can be made. For example, filter passages can be formed by depth-etching adjacent platelets on their mating surfaces, i.e., the surfaces at which adjacent platelets are bonded together, to double the cross sectional areas of the filter passage openings. Other filter passage configurations and orientations will be readily apparent and will offer additional advantages.

Figure 5:
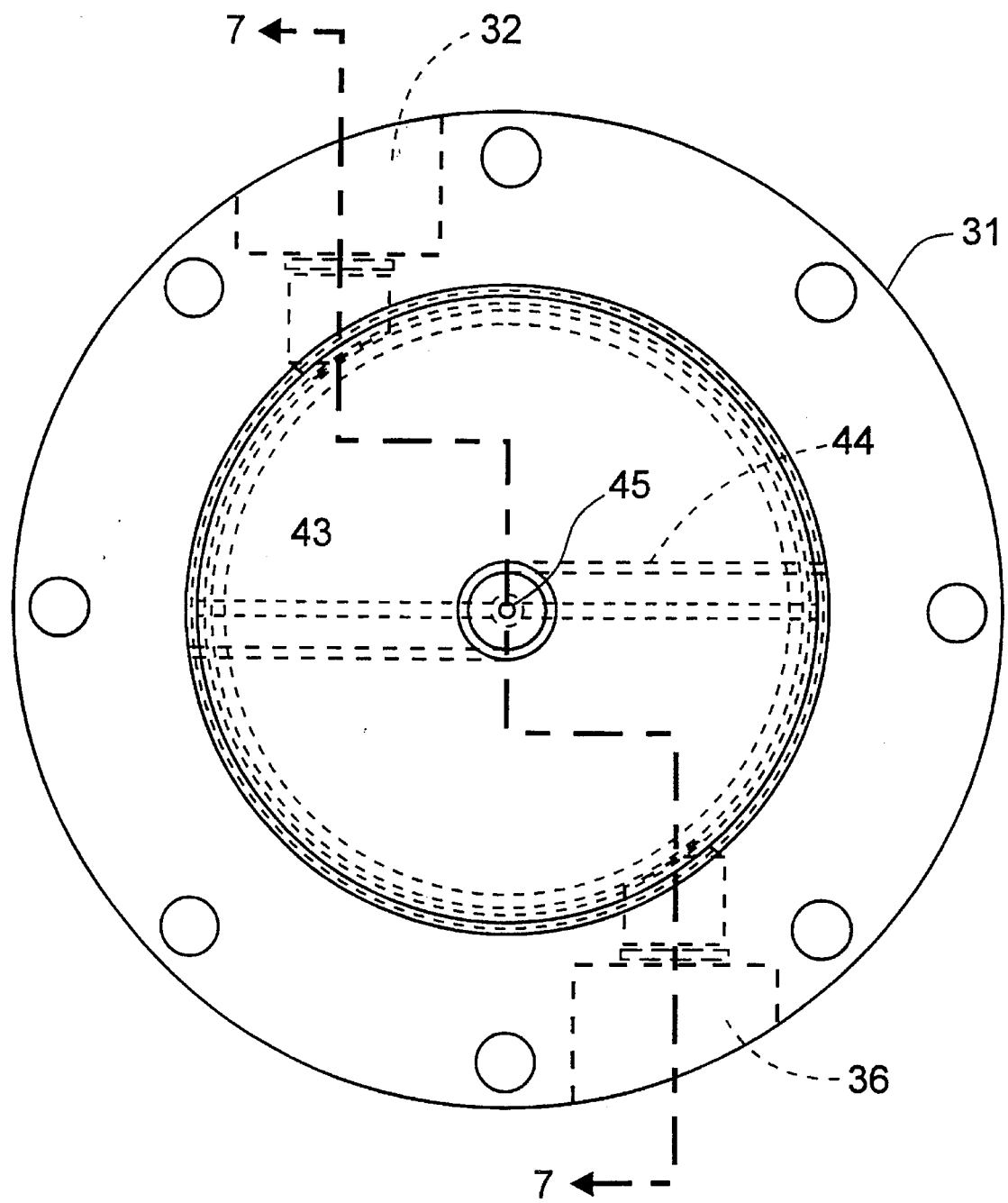
FIG. 5 is a plan view of a module containing two filter disks such as those shown in FIG. 1.
Figure 6:
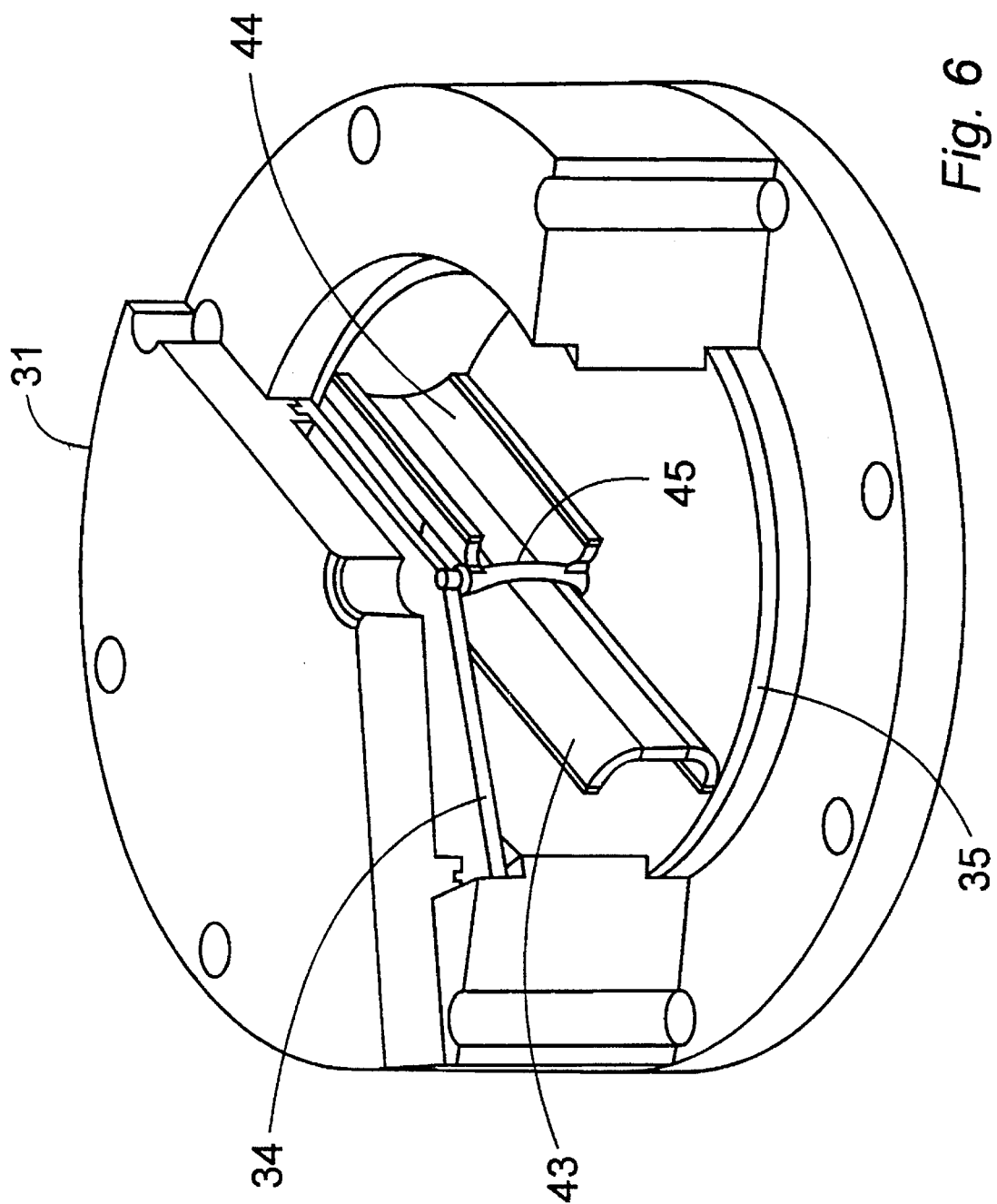
FIG. 6 is a perspective view in partial cutaway of the module of FIG. 5.
Figure 7:
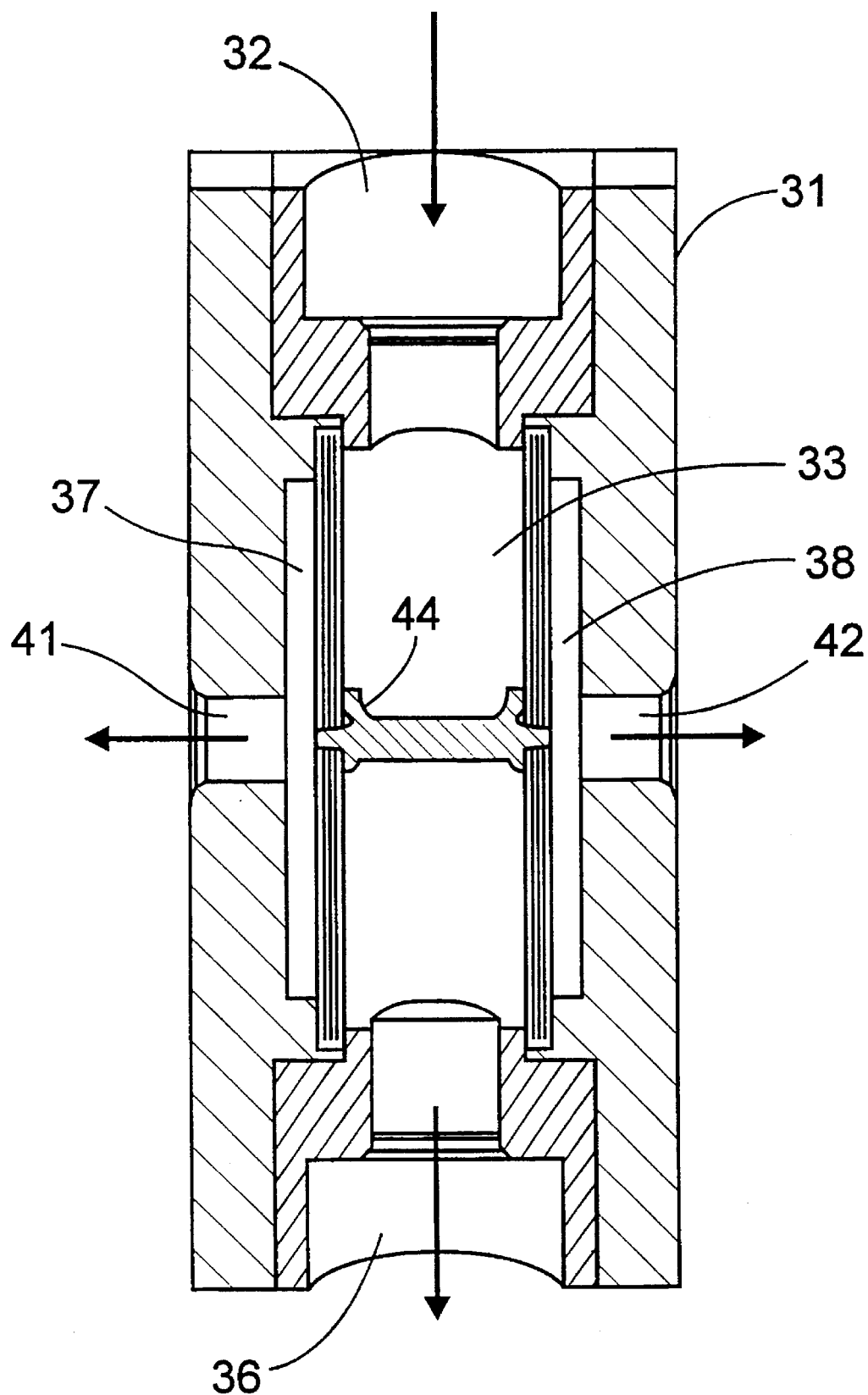
FIG. 7 is a cross section of the module of FIG. 5, taken along the line 7—7 of FIG.

A filter module incorporating two disks of the type shown in FIGS. 1 through 4 is shown in a top plan view in FIG. 5, a cutaway perspective view in FIG. 6, and a cross section in FIG. 7 taken along the line 7—7 of FIG. 5.

The module contains two circular disks in a sealed housing 31. The housing is cylindrical in shape, with inlet (contaminated) fluid entering an inlet port 32 (FIGS. 5 and 7) in the curved side wall of the cylinder, flowing into the space or chamber 33 (FIG. 7) between the two filter disks 34, 35 (FIGS. 6 and 7), and leaving the chamber through an outlet port 36 (FIGS. 5 and 7). The fluid passing through the outlet port 36 will contain a higher level of contaminant than the entering fluid.

Fluid passing through the filter disks 34, 35 enters the two external chambers 37, 38 (FIG. 7). The filtered fluid in these chambers then exits the module at either of two outlet ports 41, 42.

Occupying the chamber 33 between the two filter disks is a pair of wiper blades 43, 44 (FIGS. 5, 6 and 7) mounted to a common rotatable axis 45 (FIGS. 5 and 6) which is coaxial with the centers of the filter disks. The offset positions of the inlet port 32 and the outlet port 36 for the contaminated fluid, together with the curved impact surfaces of the wiper blades 43, 44 cause the flowing fluid to drive the rotation of the wiper blades about the axis 45. As they rotate, the blades clean both filter disk surfaces of debris deposited by the incoming fluid. The blade is preferably made from an abrasion resistant plastic material that will continuously remove the deposited debris but will not cause abrasion of the filter disk.

The module shown in FIGS. 5, 6 and 7 is but one example of the use of laminated platelet filter disks. Other configurations and methods of operation will be readily apparent to those skilled in the art of filter design.

The foregoing is offered primarily for purposes of illustration. It will be readily apparent to those skilled in the art that the materials, dimensions, configurations, and other parameters of the invention described herein may be further modified or substituted in various ways without departing from the spirit and scope of the invention.

We claim:

1. A self-cleaning microscopic pore filter, comprising:
a substantially planar laminate of platelets, each less than 0.100 inch in thickness and etched by electropolishing in patterns such that the etched regions of adjacent platelets overlap to form a plurality of flow passages sufficiently small to block passage of particles exceeding 0.01 inch in diameter;
a housing enclosing said laminate, and defining an interior divided by said laminate into an inlet chamber and an outlet chamber, said housing containing an inlet port communicating with said inlet chamber and an outlet port communicating with said outlet chamber; and
wiper means movably mounted in said inlet chamber to continuously sweep said laminate and thereby remove solid particles deposited on the surface thereof.

2. A filter in accordance with claim 1 in which said flow passages have cross sections of less than about $1\times10^{-5}$ square inch.

3. A filter in accordance with claim 1 in which said flow passages have cross sections of from about $1\times10^{-7}$ square inch to about $1\times10^{-5}$ square inch.

4. A filter in accordance with claim 1 in which said flow passages have substantially rectangular cross sections, the shortest side of which is less than about 0.002 inch in length.

5. A filter in accordance with claim 4 in which said shortest side is less than about 0.001 inch in length.

6. A filter in accordance with claim 4 in which said shortest side is less than about 0.0005 inch in length.

7. A filter in accordance with claim 1 in which said laminate is substantially circular and said wiper means is rotatably mounted in said inlet chamber to define an axis of rotation coaxial with said laminate.

8. A filter in accordance with claim 7 in which said inlet port is arranged to direct incoming fluid against said wiper means and to one side of said axis of rotation, thereby to drive rotation of said wiper means by said incoming fluid.

9. A filter in accordance with claim 1 in which said laminate is comprised of diffusion bonded platelets.

10. A filter in accordance with claim 1 in which said laminate is comprised of adhesive bonded platelets.

11. A filter in accordance with claim 1 in which said flow passages are defined by depth-etched regions in individual platelets, said depth-etched regions being less than about 0.0005 inch in depth, and said individual platelets being from about 0.001 inch to about 0.010 inch in thickness.

12. A filter in accordance with claim 1 in which said flow passages are defined by depth-etched regions in individual platelets, said depth-etched regions being less than about 0.0003 inch in depth, and said individual platelets being from about 0.001 inch to about 0.005 inch in thickness.

13. A filter in accordance with claim 1 in which said flow passages are defined as filtering passages and said platelets further containing an array of openings aligned to form inlet and outlet passages extending through substantially all platelets in said laminate, said inlet and outlet pasages adjoining but substantially larger in cross section than said filtering passages.

14. A filter in accordance with claim 13 in which said filtering passages are depth-etched passages formed by electropolishing and said openings are through-etched passages formed by photochemical etching.

* * * * *